(12) United States Patent
Lesso et al.

(10) Patent No.: US 10,984,083 B2
(45) Date of Patent: Apr. 20, 2021

(54) AUTHENTICATION OF USER USING EAR BIOMETRIC DATA

(71) Applicant: Cirrus Logic International Semiconductor Ltd., Edinburgh (GB)

(72) Inventors: John Paul Lesso, Edinburgh (GB); Thomas Lorenz, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 16/028,863

(22) Filed: Jul. 6, 2018

(65) Prior Publication Data
US 2019/0012445 A1 Jan. 10, 2019

Related U.S. Application Data

(60) Provisional application No. 62/529,710, filed on Jul. 7, 2017.

(51) Int. Cl.
| | | |
|---|---|---|
| *G06F 21/00* | (2013.01) | |
| *G06F 21/32* | (2013.01) | |
| *G10L 17/24* | (2013.01) | |
| *G10K 11/178* | (2006.01) | |
| *G10L 17/00* | (2013.01) | |

(52) U.S. Cl.
CPC .......... *G06F 21/32* (2013.01); *G10K 11/1783* (2018.01); *G10K 11/17823* (2018.01); *G10L 17/00* (2013.01); *G10L 17/24* (2013.01); *G06F 2221/2103* (2013.01); *G10K 2210/1081* (2013.01); *G10K 2210/3026* (2013.01); *G10K 2210/3027* (2013.01)

(58) Field of Classification Search
CPC ............ G06F 21/32; G06F 2221/2103; G10K 11/1783; G10K 11/17823; G10K 2210/1081; G10K 2210/3026; G10K 2210/3027; G10L 17/24; G10L 17/005
See application file for complete search history.

(56) References Cited

U.S. PATENT DOCUMENTS

| | | | |
|---|---|---|---|
| 5,197,113 | A | 3/1993 | Mumolo |
| 5,568,559 | A | 10/1996 | Makino |
| 5,787,187 | A | 7/1998 | Bouchard et al. |
| 6,480,825 | B1 | 11/2002 | Sharma et al. |
| 7,016,833 | B2 | 3/2006 | Gable et al. |

(Continued)

FOREIGN PATENT DOCUMENTS

| | | |
|---|---|---|
| AU | 2015202397 B2 | 5/2015 |
| CN | 1937955 A | 3/2007 |

(Continued)

OTHER PUBLICATIONS

International Search Report and Written Opinion of the International Searching Authority, International Application No. PCT/GB2018/051927, dated Sep. 25, 2018.

(Continued)

*Primary Examiner* — Brandon S Hoffman
*Assistant Examiner* — William A Corum, Jr.
(74) *Attorney, Agent, or Firm* — Jackson Walker L.L.P.

(57) ABSTRACT

The present invention relates to methods, apparatus and systems for authentication of a user based on ear biometric data, and voice biometric data or other authentication data. The ear biometric data may be combined with voice biometric data or with a security question and response.

15 Claims, 9 Drawing Sheets

(56) References Cited

U.S. PATENT DOCUMENTS

| | | |
|---|---|---|
| 7,039,951 B1 | 5/2006 | Chaudhari et al. |
| 7,492,913 B2 | 2/2009 | Connor et al. |
| 8,489,399 B2 | 7/2013 | Gross |
| 8,856,541 B1 | 10/2014 | Chaudhury et al. |
| 9,049,983 B1 | 6/2015 | Baldwin |
| 9,171,548 B2 | 10/2015 | Valius et al. |
| 9,305,155 B1 | 4/2016 | Vo et al. |
| 9,317,736 B1 | 4/2016 | Siddiqui |
| 9,390,726 B1 | 7/2016 | Smus et al. |
| 9,430,629 B1 | 8/2016 | Ziraknejad et al. |
| 9,484,036 B2 | 11/2016 | Kons et al. |
| 9,548,979 B1 | 1/2017 | Johnson et al. |
| 9,641,585 B2 | 5/2017 | Kvaal et al. |
| 9,646,261 B2 | 5/2017 | Agrafioti et al. |
| 9,659,562 B2 | 5/2017 | Lovitt |
| 9,665,784 B2 | 5/2017 | Derakhshani et al. |
| 9,984,314 B2 | 5/2018 | Philipose et al. |
| 10,032,451 B1 | 7/2018 | Mamkina et al. |
| 10,063,542 B1* | 8/2018 | Kao ............... G10L 17/06 |
| 10,079,024 B1 | 9/2018 | Bhimanaik et al. |
| 10,192,553 B1 | 1/2019 | Chenier et al. |
| 10,204,625 B2 | 2/2019 | Mishra et al. |
| 10,210,685 B2 | 2/2019 | Borgmeyer |
| 10,255,922 B1 | 4/2019 | Sharifi et al. |
| 10,277,581 B2 | 4/2019 | Chandrasekharan et al. |
| 10,305,895 B2 | 5/2019 | Barry et al. |
| 10,318,580 B2 | 6/2019 | Topchy et al. |
| 10,334,350 B2 | 6/2019 | Petrank |
| 10,467,509 B2 | 11/2019 | Albadawi et al. |
| 10,733,987 B1 | 8/2020 | Govender et al. |
| 2002/0194003 A1 | 12/2002 | Mozer |
| 2003/0033145 A1 | 2/2003 | Petrushin |
| 2003/0177007 A1 | 9/2003 | Kanazawa et al. |
| 2004/0030550 A1 | 2/2004 | Liu |
| 2004/0141418 A1 | 7/2004 | Matsuo et al. |
| 2005/0060153 A1 | 3/2005 | Gable et al. |
| 2005/0171774 A1 | 8/2005 | Applebaum et al. |
| 2006/0171571 A1 | 8/2006 | Chan et al. |
| 2007/0055517 A1* | 3/2007 | Spector ............. G06F 21/32 704/246 |
| 2007/0129941 A1 | 6/2007 | Tavares |
| 2007/0185718 A1 | 8/2007 | Di Mambro et al. |
| 2007/0233483 A1 | 10/2007 | Kuppuswamy et al. |
| 2007/0250920 A1* | 10/2007 | Lindsay ............. G07F 7/1025 726/7 |
| 2008/0071532 A1 | 3/2008 | Ramakrishnan et al. |
| 2008/0082510 A1 | 4/2008 | Wang et al. |
| 2008/0223646 A1 | 9/2008 | White |
| 2008/0262382 A1 | 10/2008 | Akkermans et al. |
| 2008/0285813 A1 | 11/2008 | Holm |
| 2009/0087003 A1* | 4/2009 | Zurek ............. G06K 9/00885 381/312 |
| 2009/0105548 A1* | 4/2009 | Bart ............. A61B 5/02438 600/300 |
| 2009/0167307 A1 | 7/2009 | Kopp |
| 2009/0232361 A1 | 9/2009 | Miller |
| 2009/0281809 A1* | 11/2009 | Reuss ............. G10L 17/24 704/273 |
| 2009/0319270 A1 | 12/2009 | Gross |
| 2010/0004934 A1 | 1/2010 | Hirose et al. |
| 2010/0076770 A1 | 3/2010 | Ramaswamy |
| 2010/0204991 A1 | 8/2010 | Ramakrishnan et al. |
| 2010/0328033 A1 | 12/2010 | Kamei |
| 2011/0051907 A1* | 3/2011 | Jaiswal ............. H04M 3/4936 379/88.02 |
| 2011/0246198 A1 | 10/2011 | Asenjo et al. |
| 2011/0276323 A1 | 11/2011 | Seyfetdinov |
| 2011/0314530 A1 | 12/2011 | Donaldson |
| 2011/0317848 A1 | 12/2011 | Ivanov et al. |
| 2012/0110341 A1* | 5/2012 | Beigi ............. H04L 9/3268 713/186 |
| 2012/0223130 A1 | 9/2012 | Knopp et al. |
| 2012/0224456 A1 | 9/2012 | Visser et al. |
| 2012/0249328 A1 | 10/2012 | Xiong |
| 2012/0323796 A1 | 12/2012 | Udani |
| 2013/0024191 A1 | 1/2013 | Krutsch et al. |
| 2013/0058488 A1 | 3/2013 | Cheng et al. |
| 2013/0080167 A1 | 3/2013 | Mozer |
| 2013/0227678 A1 | 8/2013 | Kang |
| 2013/0247082 A1 | 9/2013 | Wang et al. |
| 2013/0279297 A1 | 10/2013 | Wulff et al. |
| 2013/0279724 A1 | 10/2013 | Stafford |
| 2013/0289999 A1 | 10/2013 | Hymel |
| 2014/0059347 A1 | 2/2014 | Dougherty et al. |
| 2014/0149117 A1 | 5/2014 | Bakish et al. |
| 2014/0188770 A1 | 7/2014 | Agrafioti et al. |
| 2014/0237576 A1 | 8/2014 | Zhang et al. |
| 2014/0241597 A1 | 8/2014 | Leite |
| 2014/0293749 A1 | 10/2014 | Gervaise |
| 2014/0307876 A1 | 10/2014 | Agiomyrgiannakis et al. |
| 2014/0330568 A1 | 11/2014 | Lewis et al. |
| 2014/0337945 A1* | 11/2014 | Jia ............. G06F 21/32 726/6 |
| 2014/0343703 A1 | 11/2014 | Topchy et al. |
| 2015/0006163 A1 | 1/2015 | Liu et al. |
| 2015/0033305 A1 | 1/2015 | Shear et al. |
| 2015/0036462 A1 | 2/2015 | Calvarese |
| 2015/0088509 A1 | 3/2015 | Gimenez et al. |
| 2015/0089616 A1 | 3/2015 | Brezinski et al. |
| 2015/0112682 A1 | 4/2015 | Rodriguez et al. |
| 2015/0134330 A1 | 5/2015 | Baldwin et al. |
| 2015/0161370 A1 | 6/2015 | North et al. |
| 2015/0161459 A1 | 6/2015 | Boczek |
| 2015/0245154 A1 | 8/2015 | Dadu et al. |
| 2015/0261944 A1 | 9/2015 | Hosom et al. |
| 2015/0276254 A1* | 10/2015 | Nemcek ............. F24D 19/1084 700/278 |
| 2015/0301796 A1 | 10/2015 | Visser et al. |
| 2015/0332665 A1 | 11/2015 | Mishra et al. |
| 2015/0347734 A1* | 12/2015 | Beigi ............. G06F 21/32 713/155 |
| 2015/0356974 A1 | 12/2015 | Tani et al. |
| 2015/0371639 A1 | 12/2015 | Foerster et al. |
| 2016/0026781 A1* | 1/2016 | Boczek ............. G06K 9/00885 726/18 |
| 2016/0071516 A1 | 3/2016 | Lee et al. |
| 2016/0086609 A1 | 3/2016 | Yue et al. |
| 2016/0111112 A1 | 4/2016 | Hayakawa |
| 2016/0125877 A1 | 5/2016 | Foerster et al. |
| 2016/0125879 A1 | 5/2016 | Lovitt |
| 2016/0147987 A1 | 5/2016 | Jang et al. |
| 2016/0210407 A1 | 7/2016 | Hwang et al. |
| 2016/0217321 A1 | 7/2016 | Gottleib |
| 2016/0234204 A1 | 8/2016 | Rishi et al. |
| 2016/0314790 A1 | 10/2016 | Tsujikawa et al. |
| 2016/0324478 A1 | 11/2016 | Goldstein |
| 2016/0330198 A1 | 11/2016 | Stern et al. |
| 2016/0371555 A1 | 12/2016 | Derakhshani |
| 2017/0011406 A1* | 1/2017 | Tunnell ............. G06Q 20/40145 |
| 2017/0049335 A1 | 2/2017 | Duddy |
| 2017/0068805 A1 | 3/2017 | Chandrasekharan et al. |
| 2017/0078780 A1* | 3/2017 | Qian ............. H04R 1/105 |
| 2017/0110121 A1 | 4/2017 | Warford et al. |
| 2017/0112671 A1 | 4/2017 | Goldstein |
| 2017/0116995 A1* | 4/2017 | Ady ............. G10L 17/24 |
| 2017/0134377 A1 | 5/2017 | Tokunaga et al. |
| 2017/0161482 A1 | 6/2017 | Eltoft et al. |
| 2017/0169828 A1 | 6/2017 | Sachdev |
| 2017/0200451 A1 | 7/2017 | Bocklet et al. |
| 2017/0213268 A1 | 7/2017 | Puehse et al. |
| 2017/0214687 A1 | 7/2017 | Klein et al. |
| 2017/0231534 A1 | 8/2017 | Agassy et al. |
| 2017/0243597 A1 | 8/2017 | Braasch |
| 2017/0256270 A1 | 9/2017 | Singaraju et al. |
| 2017/0279815 A1 | 9/2017 | Chung et al. |
| 2017/0287490 A1 | 10/2017 | Biswal et al. |
| 2017/0323644 A1 | 11/2017 | Kawato |
| 2017/0347180 A1 | 11/2017 | Petrank |
| 2017/0347348 A1 | 11/2017 | Masaki et al. |
| 2017/0351487 A1 | 12/2017 | Aviles-Casco Vaquero et al. |
| 2018/0018974 A1 | 1/2018 | Zass |
| 2018/0032712 A1 | 2/2018 | Oh et al. |
| 2018/0039769 A1 | 2/2018 | Saunders et al. |

(56) References Cited

U.S. PATENT DOCUMENTS

| | | | |
|---|---|---|---|
| 2018/0047393 A1 | 2/2018 | Tian et al. | |
| 2018/0060557 A1 | 3/2018 | Valenti et al. | |
| 2018/0096120 A1* | 4/2018 | Boesen | G06F 21/32 |
| 2018/0107813 A1* | 4/2018 | Perotti | G06F 21/32 |
| 2018/0107866 A1 | 4/2018 | Li et al. | |
| 2018/0108225 A1 | 4/2018 | Mappus et al. | |
| 2018/0113673 A1* | 4/2018 | Sheynblat | G10L 17/00 |
| 2018/0121161 A1 | 5/2018 | Ueno et al. | |
| 2018/0146370 A1* | 5/2018 | Krishnaswamy | H04L 63/0861 |
| 2018/0166071 A1 | 6/2018 | Lee et al. | |
| 2018/0174600 A1 | 6/2018 | Chaudhuri et al. | |
| 2018/0176215 A1* | 6/2018 | Perotti | H04W 76/10 |
| 2018/0187969 A1 | 7/2018 | Kim et al. | |
| 2018/0191501 A1 | 7/2018 | Lindemann | |
| 2018/0232201 A1 | 8/2018 | Holtmann | |
| 2018/0232511 A1* | 8/2018 | Bakish | H04L 9/3231 |
| 2018/0233142 A1 | 8/2018 | Koishida et al. | |
| 2018/0239955 A1 | 8/2018 | Rodriguez et al. | |
| 2018/0240463 A1* | 8/2018 | Perotti | G10L 17/08 |
| 2018/0254046 A1 | 9/2018 | Khoury et al. | |
| 2018/0289354 A1 | 10/2018 | Cvijanovic et al. | |
| 2018/0292523 A1 | 10/2018 | Orenstein et al. | |
| 2018/0308487 A1 | 10/2018 | Goel et al. | |
| 2018/0324518 A1* | 11/2018 | Dusan | H04R 1/1091 |
| 2018/0336716 A1 | 11/2018 | Ramprashad et al. | |
| 2018/0336901 A1* | 11/2018 | Masaki | G10L 15/265 |
| 2018/0358020 A1 | 12/2018 | Chen et al. | |
| 2018/0366124 A1 | 12/2018 | Cilingir et al. | |
| 2018/0374487 A1 | 12/2018 | Lesso | |
| 2019/0005963 A1 | 1/2019 | Alonso et al. | |
| 2019/0005964 A1 | 1/2019 | Alonso et al. | |
| 2019/0013033 A1 | 1/2019 | Bhimanaik et al. | |
| 2019/0027152 A1 | 1/2019 | Huang et al. | |
| 2019/0030452 A1 | 1/2019 | Fassbender et al. | |
| 2019/0042871 A1 | 2/2019 | Pogorelik | |
| 2019/0065478 A1 | 2/2019 | Tsujikawa et al. | |
| 2019/0098003 A1 | 3/2019 | Ota | |
| 2019/0114496 A1 | 4/2019 | Lesso | |
| 2019/0114497 A1 | 4/2019 | Lesso | |
| 2019/0115030 A1 | 4/2019 | Lesso | |
| 2019/0115032 A1 | 4/2019 | Lesso | |
| 2019/0115033 A1 | 4/2019 | Lesso | |
| 2019/0115046 A1 | 4/2019 | Lesso | |
| 2019/0147888 A1 | 5/2019 | Lesso | |
| 2019/0149932 A1 | 5/2019 | Lesso | |
| 2019/0180014 A1 | 6/2019 | Kovvali et al. | |
| 2019/0197755 A1 | 6/2019 | Vats | |
| 2019/0199935 A1 | 6/2019 | Danielsen et al. | |
| 2019/0228778 A1 | 7/2019 | Lesso | |
| 2019/0228779 A1 | 7/2019 | Lesso | |
| 2019/0246075 A1 | 8/2019 | Khadloya et al. | |
| 2019/0260731 A1 | 8/2019 | Chandrasekharan et al. | |
| 2019/0294629 A1 | 9/2019 | Wexler et al. | |
| 2019/0295554 A1 | 9/2019 | Lesso | |
| 2019/0306594 A1 | 10/2019 | Aumer et al. | |
| 2019/0311722 A1 | 10/2019 | Caldwell | |
| 2019/0313014 A1 | 10/2019 | Welbourne et al. | |
| 2019/0318035 A1 | 10/2019 | Blanco et al. | |
| 2019/0356588 A1 | 11/2019 | Shahraray et al. | |
| 2019/0371330 A1 | 12/2019 | Lin et al. | |
| 2019/0373438 A1* | 12/2019 | Amir | H04W 4/90 |
| 2019/0392145 A1 | 12/2019 | Komogortsev | |
| 2019/0394195 A1* | 12/2019 | Chari | H04L 63/0861 |
| 2020/0035247 A1 | 1/2020 | Boyadjiev et al. | |
| 2020/0204937 A1 | 6/2020 | Lesso | |

FOREIGN PATENT DOCUMENTS

| | | |
|---|---|---|
| CN | 104956715 A | 9/2015 |
| CN | 105185380 A | 12/2015 |
| CN | 105702263 A | 6/2016 |
| CN | 105869630 A | 8/2016 |
| CN | 105913855 A | 8/2016 |
| CN | 105933272 A | 9/2016 |
| CN | 105938716 A | 9/2016 |
| CN | 106297772 A | 1/2017 |
| CN | 106531172 A | 3/2017 |
| EP | 1205884 A2 | 5/2002 |
| EP | 1701587 A1 | 9/2006 |
| EP | 1928213 A1 | 6/2008 |
| EP | 2660813 A1 | 11/2013 |
| EP | 2704052 A2 | 3/2014 |
| EP | 2860706 A2 | 4/2015 |
| EP | 3016314 A1 | 5/2016 |
| EP | 3156978 A1 | 4/2017 |
| GB | 2375205 A | 11/2002 |
| GB | 2493849 A | 2/2013 |
| GB | 2499781 A | 9/2013 |
| GB | 2515527 A | 12/2014 |
| GB | 2541466 A | 2/2017 |
| GB | 2551209 A | 12/2017 |
| JP | 2003058190 A | 2/2003 |
| JP | 2006010809 A | 1/2006 |
| WO | 9834216 A2 | 8/1998 |
| WO | 02/103680 A2 | 12/2002 |
| WO | 2006/054205 A1 | 5/2006 |
| WO | 2007034371 A2 | 3/2007 |
| WO | 2008113024 A1 | 9/2008 |
| WO | 2010066269 A1 | 6/2010 |
| WO | 2013022930 A1 | 2/2013 |
| WO | 2013154790 A1 | 10/2013 |
| WO | 201404124 A1 | 3/2014 |
| WO | 2015/117674 A1 | 8/2015 |
| WO | 2015117674 A1 | 8/2015 |
| WO | 2015163774 A1 | 10/2015 |
| WO | 2016003299 A1 | 1/2016 |
| WO | 2017055551 A | 4/2017 |
| WO | 2017203484 A1 | 11/2017 |

OTHER PUBLICATIONS

Combined Search and Examination Report under Sections 17 and 18(3), UKIPO, Application No. 1801530.5, dated Jul. 25, 2018.
International Search Report and Written Opinion of the International Searching Authority, International Application No. PCT/GB2018/053274, dated Jan. 24, 2019.
Beigi, Homayoon, "Fundamentals of Speaker Recognition," Chapters 8-10, ISBN: 978-0-378-77592-0; 2011.
Li, Lantian et al., "A Study on Replay Attack and Anti-Spoofing for Automatic Speaker Verification", INTERSPEECH 2017, Jan. 1, 2017, pp. 92-96.
Li, Zhi et al., "Compensation of Hysteresis Nonlinearity in Magnetostrictive Actuators with Inverse Multiplicative Structure for Preisach Model", IEE Transactions on Automation Science and Engineering, vol. 11, No. 2, Apr. 1, 2014, pp. 613-619.
Partial International Search Report of the International Searching Authority, International Application No. PCT/GB2018/052905, dated Jan. 25, 2019.
Further Search Report under Sections 17 (6), UKIPO, Application No. GB1719731.0, dated Nov. 26, 2018.
Combined Search and Examination Report, UKIPO, Application No. GB1713695.3, dated Feb. 19, 2018.
Zhang et al., An Investigation of Deep-Learing Frameworks for Speaker Verification Antispoofing—IEEE Journal of Selected Topics in Signal Processes, Jun. 1, 2017.
Combined Search and Examination Report under Sections 17 and 18(3), UKIPO, Application No. GB18048419, dated Sep. 27, 2018.
Wu et al., Anti-Spoofing for text-Independent Speaker Verification: An Initial Database, Comparison of Countermeasures, and Human Performance, IEEE/ACM Transactions on Audio, Speech, and Language Processing, Issue Date: Apr. 2016.
Combined Search and Examination Report under Sections 17 and 18(3), UKIPO, Application No. GB1803570.9, dated Aug. 21, 2018.
Combined Search and Examination Report under Sections 17 and 18(3), UKIPO, Application No. GB1801661.8, dated Jul. 30, 2018.
Combined Search and Examination Report under Sections 17 and 18(3), UKIPO, Application No. GB1801663.4, dated Jul. 18, 2018.
Combined Search and Examination Report under Sections 17 and 18(3), UKIPO, Application No. GB1801684.2, dated Aug. 1, 2018.

(56) References Cited

OTHER PUBLICATIONS

Combined Search and Examination Report under Sections 17 and 18(3), UKIPO, Application No. GB1719731.0, dated May 16, 2018.
Combined Search and Examination Report, UKIPO, Application No. GB1801874.7, dated Jul. 25, 2018.
Combined Search and Examination Report under Sections 17 and 18(3), UKIPO, Application No. GB1801659.2, dated Jul. 26, 2018.
International Search Report and Written Opinion of the International Searching Authority, International Application No. PCT/GB2018/052906, dated Jan. 14, 2019.
International Search Report and Written Opinion of the International Searching Authority, International Application No. PCT/GB2019/050185, dated Apr. 2, 2019.
Combined Search and Examination Report under Sections 17 and 18(3), UKIPO, Application No. GB1809474.8, dated Jul. 23, 2018.
Ajmera, et al,, "Robust Speaker Change Detection," IEEE Signal Processing Letters, vol. 11, No. 8, pp. 649-651, Aug. 2004.
International Search Report and Written Opinion of the International Searching Authority, International Application No. PCT/GB2018/051760, dated Aug. 3, 2018.
International Search Report and Written Opinion of the International Searching Authority, International Application No. PCT/GB2018/051787, dated Aug. 16, 2018.
Villalba, Jesus et al., Preventing Replay Attacks on Speaker Verification Systems, International Carnahan Conference on Security Technology (ICCST), 2011 IEEE, Oct. 18, 2011, pp. 1-8.
International Search Report and Written Opinion of the International Searching Authority, International Application No. PCT/GB2018/051765, dated Aug. 16, 2018.
Combined Search and Examination Report under Sections 17 and 18(3), UKIPO, Application No. GB1713697.9, dated Feb. 20, 2018.
Chen et al., "You Can Hear But You Cannot Steal: Defending Against Voice Impersonation Attacks on Smartphones", Proceedings of the International Conference on Distributed Computing Systems, PD: 20170605.
International Search Report and Written Opinion of the International Searching Authority, International Application No. PCT/GB2018/052907, dated Jan. 15, 2019.
Combined Search and Examination Report under Sections 17 and 18(3), UKIPO, Application No. GB1713699.5, dated Feb. 21, 2018.
Lim, Zhi Hao et al., An Investigation of Spectral Feature Partitioning for Replay Attacks Detection, Proceedings of APSIPA Annual Summit and Conference 2017, Dec. 12-15, 2017, Malaysia, pp. 1570-1573.
International Search Report and Written Opinion of the International Searching Authority, International Application No. PCT/GB2019/052302, dated Oct. 2, 2019.
Liu, Yuan et al, "Speaker verification with deep features", Jul. 2014, in International Joint Conference on Neural Networks (IJCNN), pp. 747-753, IEEE.
International Search Report and Written Opinion of the International Searching Authority, International Application No. PCT/GB2018/051925, dated Sep. 26, 2018.
Combined Search and Examination Report under Sections 17 and 18(3), UKIPO, Application No. 1801528.9, dated Jul. 25, 2018.
International Search Report and Written Opinion of the International Searching Authority, International Application No. PCT/GB2018/051924, dated Sep. 26, 2018.
Combined Search and Examination Report under Sections 17 and 18(3), UKIPO, Application No. 1801526.3, dated Jul. 25, 2018.
International Search Report and Written Opinion of the International Searching Authority, International Application No. PCT/GB2019/051928, dated Dec. 3, 2019.
Combined Search and Examination Report under Sections 17 and 18(3), UKIPO, Application No. 1801532.1, dated Jul. 25, 2018.
International Search Report and Written Opinion of the International Searching Authority, International Application No. PCT/GB2019/052143, dated Sep. 17, 2019.
International Search Report and Written Opinion of the International Searching Authority, International Application No. PCT/GB2018/051931, dated Sep. 27, 2018.
Combined Search and Examination Report under Sections 17 and 18(3), UKIPO, Application No. 1801527.1, dated Jul. 25, 2018.
Lucas, Jim, What is Electromagnetic Radiation?, Mar. 13, 2015, Live Science, https://www.livescience.com/38169-electromagnetism.html, pp. 1-11 (Year: 2015).
Ohtsuka, Takahiro and Kasuya, Hideki, Robust ARX Speech Analysis Method Taking Voice Source Pulse Train Into Account, Journal of the Acoustical Society of Japan, 58, 7, pp. 386-397, 2002.
Wikipedia, Voice (phonetics), https://en.wikipedia.org/wiki/Voice_(phonetics), accessed Jun. 1, 2020.
Zhang et al., DolphinAttack: Inaudible Voice Commands, Retrieved from Proceedings of the 2017 ACM SIGSAC Conference on Computer and Communications Security, Aug. 2017.
Song, Liwei, and Prateek Mittal, Poster: Inaudible Voice Commands, Proceedings of the 2017 ACM SIGSAC Conference on Computer and Communications Security, Aug. 2017.
Fortuna, Andrea, [Online], DolphinAttack: inaudiable voice commands allow attackers to control Siri, Alexa and other digital assistants, Sep. 2017.
First Office Action, China National Intellectual Property Administration, Patent Application No. 2018800418983, dated May 29, 2020.
International Search Report and Written Opinion, International Application No. PCT/GB2020/050723, dated Jun. 16, 2020.
Liu, Yuxi et al., "Earprint: Transient Evoked Otoacoustic Emission for Biometrics", IEEE Transactions on Information Forensics and Security, IEEE, Piscataway, NJ, US, vol. 9, No. 12, Dec. 1, 2014, pp. 2291-2301.
Seha, Sherif Nagib Abbas et al., "Human recognition using transient auditory evoked potentials: a preliminary study", IET Biometrics, IEEE, Michael Faraday House, Six Hills Way, Stevenage, Herts., UK, vol. 7, No. 3, May 1, 2018, pp. 242-250.
Liu, Yuxi et al., "Biometric identification based on Transient Evoked Otoacoustic Emission", IEEE International Symposium on Signal Processing and Information Technology, IEEE, Dec. 12, 2013, pp. 267-271.
Brownlee, Jason, A Gentle Introduction to Autocorrelation and Partial Autocorrelation, Feb. 6, 2017, https://machinelearningmastery.com/gentle-introduction-autocorrelation-partial-autocorrelation/, accessed Apr. 28, 2020.
Toth, Arthur R., et al., Synthesizing Speech from Doppler Signals, ICASSP 2010, IEEE, pp. 4638-4641.
Boesen, U.S. Appl. No. 62/403,045, filed Sep. 30, 2017.
Meng, Y. et al, "Liveness Detection for Voice User Interface via Wireless Signals in IoT Environment," in IEEE Transactions on Dependable and Secure Computing, doi: 10.1109/TDSC.2020.2973620.
Zhang, L. et al., Hearing Your Voice is Not Enough: An Articulatory Gesture Based Liveness Detection for Voice Authentication, CCS '17: Proceedings of the 2017 ACM SIGSAC Conference on Computer and Communications Security, Oct. 2017 pp. 57-71.
First Office Action, China National Intellectual Property Administration, Application No. 2018800720846, dated Mar. 1, 2021.

\* cited by examiner

AUTHENTICATION OF USER USING EAR BIOMETRIC DATA

TECHNICAL FIELD

Embodiments of the disclosure relate to methods, apparatus and systems for authentication of a user, and particularly to methods, apparatus and systems for authentication of a user based on ear biometric data.

BACKGROUND

It is known that the acoustic properties of a user's ear, whether the outer parts (known as the pinna or auricle), the ear canal or both, differ substantially between individuals and can therefore be used as a biometric to identify the user. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize an individual.

For example, the ear canal is a resonant system, and therefore one feature which may be extracted from the response signal is the resonant frequency of the ear canal. If the measured resonant frequency (i.e. in the response signal) differs from a stored resonant frequency for the user, a biometric algorithm coupled to receive and analyse the response signal may return a negative result. Other features of the response signal may be similarly extracted and used to characterize the individual. For example, the features may comprise one or more mel frequency cepstrum coefficients. More generally, the transfer function between the acoustic stimulus and the measured response signal (or features of the transfer function) may be determined, and compared to a stored transfer function (or stored features of the transfer function) which is characteristic of the user.

SUMMARY

One problem faced by biometric algorithms is the need to achieve acceptable performance in two respects. First, the algorithm should provide acceptable security so that unauthorised users are not falsely recognized as authorised users. The likelihood that the algorithm will accept an access attempt by an unauthorised user is known as the false acceptance rate (FAR), and should be kept low if the algorithm is to provide reasonable security. Second, the algorithm should work reliably, so that authorised users are not falsely rejected as unauthorised. The likelihood that the algorithm will reject an access attempt by an authorised user is known as the false rejection rate (FRR), and should also be kept low if the algorithm is not to prove frustrating for authorised users seeking authentication.

The problem is that these two performance requirements conflict with each other. A low FRR can be achieved by relaxing the requirements for a user to achieve authentication. However, this will also have the consequence of increasing the FAR. Conversely, a low FAR can be achieved by making the requirements for a user to achieve authentication stricter. However, this will have the consequence of increasing the FRR.

One way to decrease both FAR and FRR is to increase the efficacy of the biometric algorithm itself. However, designing the algorithm to achieve high performance is difficult. Further, the efficacy may depend on factors which are outside the designers' control. For example, the efficacy of the algorithm may depend on the quality of the biometric data. However, the user may be in a noisy environment such that poor data quality is unavoidable.

The efficacy of the algorithm may further depend on the discriminatory nature of the biometric itself. For example, a biometric algorithm which discriminates between users based solely on gender will only ever achieve a 50% FAR and a 50% FRR at best.

The efficacy of the authentication process overall may therefore be improved by combining multiple authentication processes (whether biometric or not). Each authentication process may be associated with particular FAR and FRR values; however, the FAR and FRR for the combination of multiple authentication processes may be significantly lower.

For example, let us assume that a first authentication process has a FAR of 10%; one in ten users will be accepted by the first authentication process (i.e. identified as an authorised user). Now let us assume that the user is required to pass a second authentication process, which also has a FAR of 10%, in addition to the first authentication process. Although one in ten users will be accepted by the second authentication process, the overall FAR (i.e. based on the combination of the first and second authentication processes) will in fact be 1%. Therefore the overall authentication process is markedly improved without having to improve either the first or second authentication process individually.

According to embodiments of the present disclosure, ear biometric data, which may be acquired using any of the personal audio devices described above with respect to FIGS. 1a to 1e, is combined with authentication data acquired via one or more further mechanisms, to improve the performance of the overall authentication process. For example, in one embodiment, the ear biometric data is combined with voice biometric data. In another embodiment, the ear biometric data is combined with a security question and response. In the latter embodiment, the security question may be output to the user audibly, and the (audible) response detected with a microphone. The response may therefore additionally be used for voice biometric authentication.

One aspect of the disclosure provides a method in a biometric authentication system. The method comprises: obtaining ear biometric data for a user to be authenticated; identifying the user as a particular authorised user based on the ear biometric data; outputting a security question message to the user, specific to the particular authorised user; and authenticating the user as the particular authorised user based on a response message from the user.

Another aspect of the disclosure provides a method in a biometric authentication system. The method comprises: obtaining ear biometric data for a user to be authenticated; obtaining voice biometric data from the user to be authenticated; and utilizing the ear biometric data and the voice biometric data to authenticate an identity of the user.

A further aspect of the disclosure provides a method in a biometric authentication system. The method comprises: obtaining ear biometric data for a user to be authenticated; outputting a security question message to the user; and authenticating the user as an authorised user based on the ear biometric data and a response message from the user.

Another aspect provides an apparatus for biometric authentication. The apparatus comprises: an ear biometric module configured to obtain ear biometric data for a user to be authenticated; a decision module configured to identify the user as a particular authorised user based on the ear biometric data; an output, for outputting a security question message to the user, specific to the particular authorised user; and an authentication module configured to authenticate the user as the particular authorised user based on a response message from the user.

An aspect of the disclosure provides an electronic apparatus comprising processing circuitry and a non-transitory machine-readable medium storing instructions which, when executed by the processing circuitry, cause the electronic apparatus to: obtain ear biometric data for a user to be authenticated; identify the user as a particular authorised user based on the ear biometric data; output a security question message to the user, specific to the particular authorised user; and authenticate the user as the particular authorised user based on a response message from the user.

A further aspect provides a non-transitory machine-readable medium storing instructions which, when executed by processing circuitry, cause an electronic apparatus to: obtain ear biometric data for a user to be authenticated; identify the user as a particular authorised user based on the ear biometric data; output a security question message to the user, specific to the particular authorised user; and authenticate the user as the particular authorised user based on a response message from the user.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

As noted above, ear biometric data may be acquired by the generation of an acoustic stimulus, and the detection of an acoustic response of the ear to the acoustic stimulus. One or more features may be extracted from the response signal, and used to characterize the individual.

The acoustic stimulus may be generated and the response measured using a personal audio device. As used herein, the term "personal audio device" is any electronic device which is suitable for, or configurable to, provide audio playback substantially to only a single user. Some examples of suitable personal audio devices are shown in FIGS. 1a to 1e.

Figure 1A:
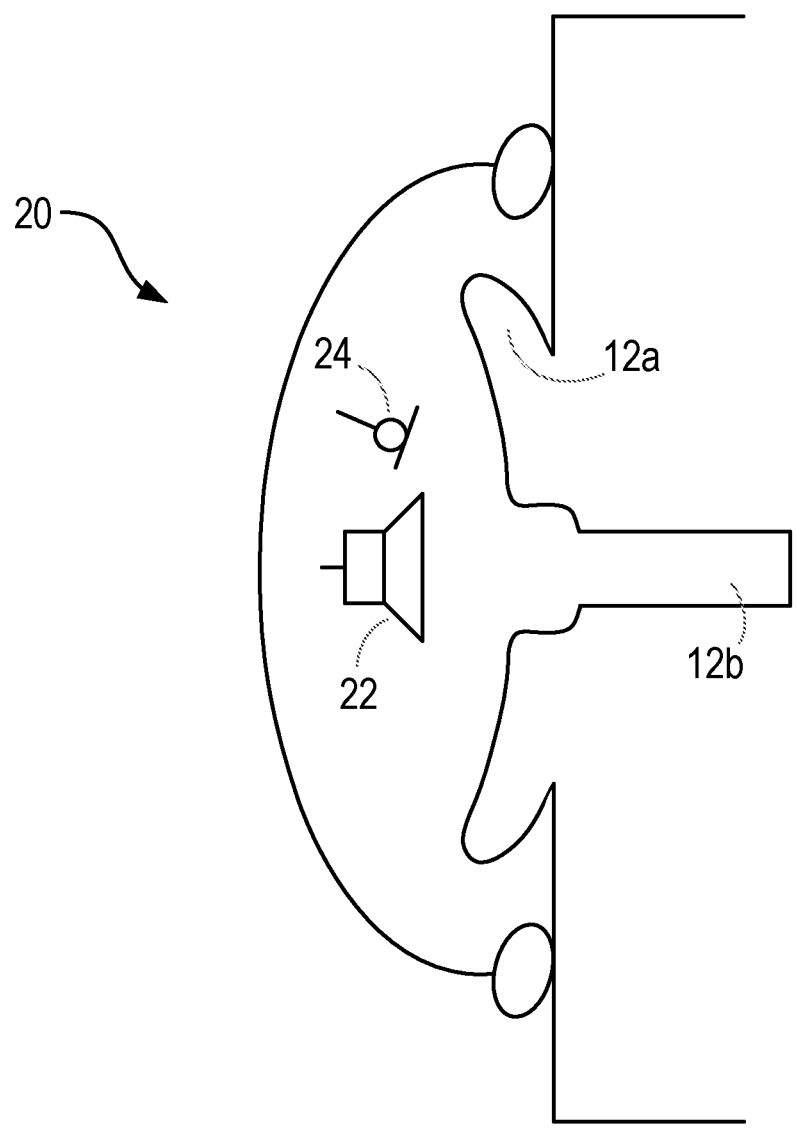
FIGS. 1a to 1e show examples of personal audio devices.

FIG. 1a shows a schematic diagram of a user's ear, comprising the (external) pinna or auricle 12a, and the (internal) ear canal 12b. A personal audio device 20 comprising a circum-aural headphone is worn by the user over the ear. The headphone comprises a shell which substantially surrounds and encloses the auricle, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b.

The headphone may be able to perform active noise cancellation, to reduce the amount of noise experienced by the user of the headphone. Active noise cancellation operates by detecting a noise (i.e. with a microphone), and generating a signal (i.e. with a loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

Figure 1B:
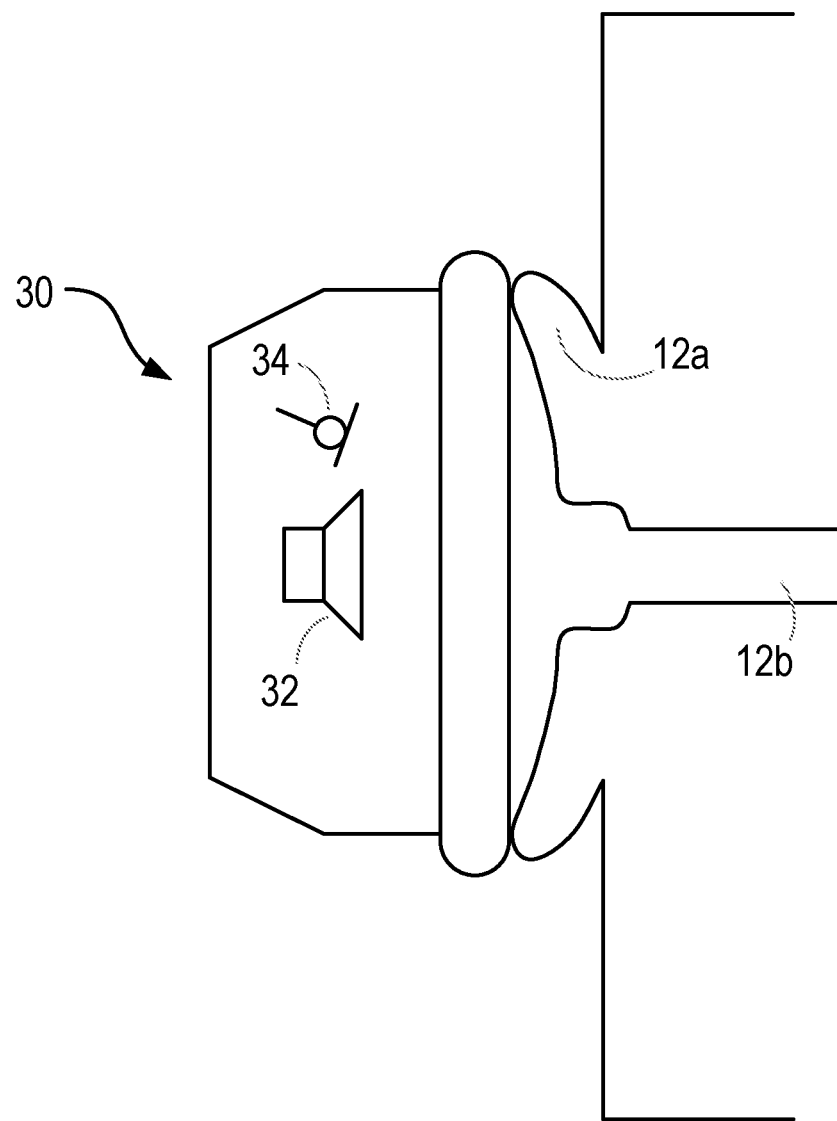

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circum-aural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
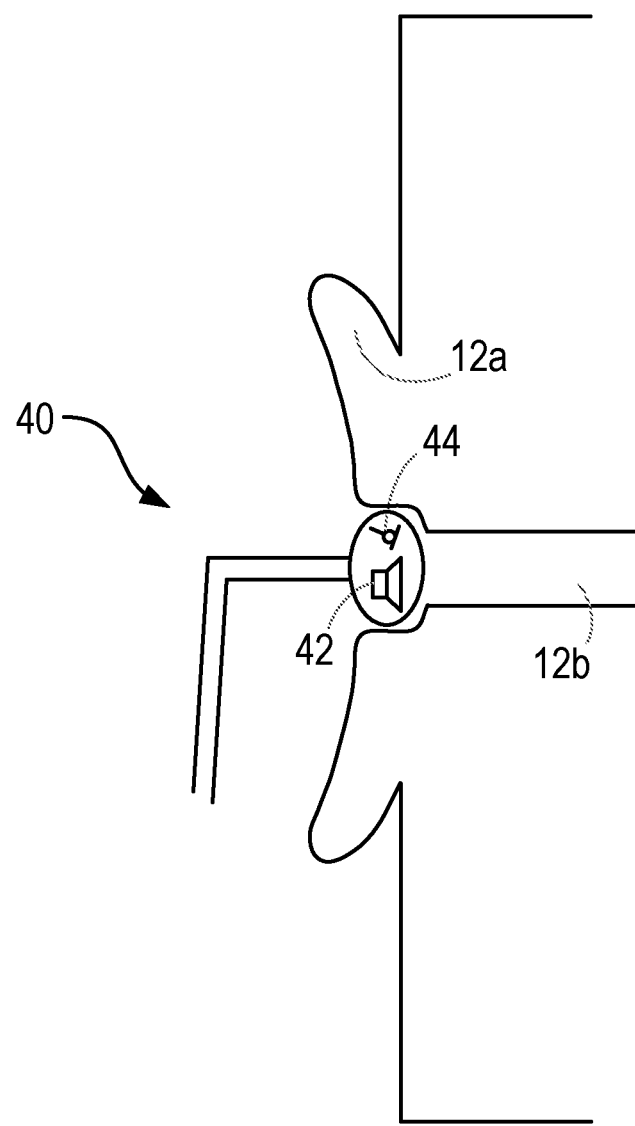

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
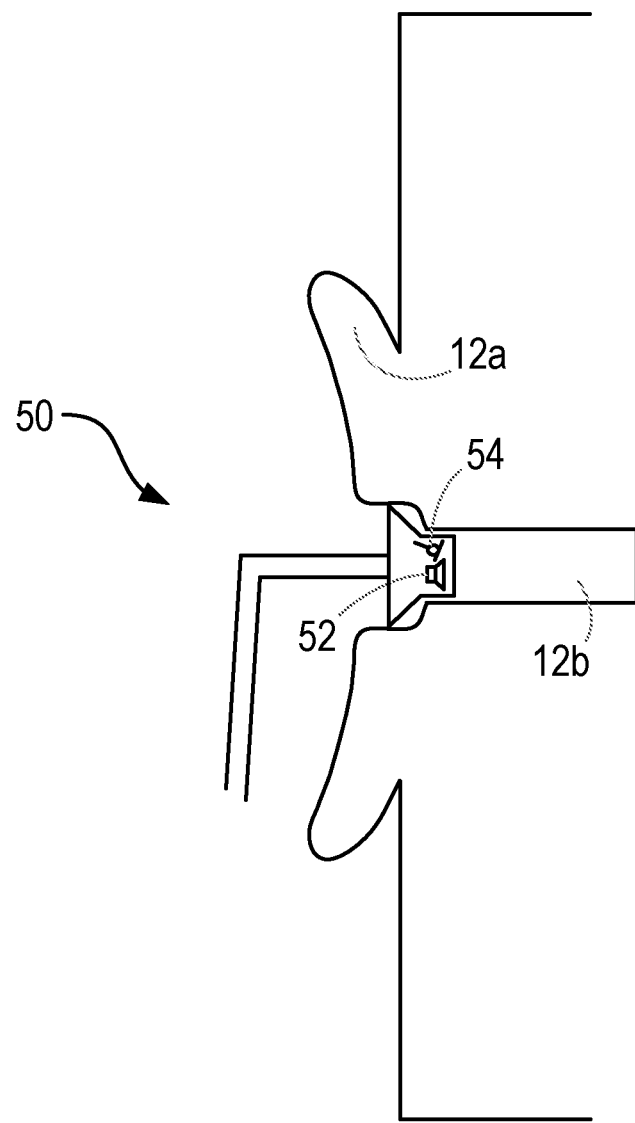

FIG. 1d shows a further alternative personal audio device 50, comprising an in-ear headphone (or earphone), insert headphone, or ear bud. This headphone is configured to be partially or totally inserted within the ear canal 12b, and may provide a relatively tight seal between the ear canal 12b and the external environment (i.e. it may be acoustically closed or sealed). The headphone may comprise one or more loudspeakers 52 and one or more microphones 54, as with the others devices described above, and these components may form part of an active noise cancellation system.

As the in-ear headphone may provide a relatively tight acoustic seal around the ear canal 12b, external noise (i.e.

coming from the environment outside) detected by the microphone 54 is likely to be low.

Figure 1E:
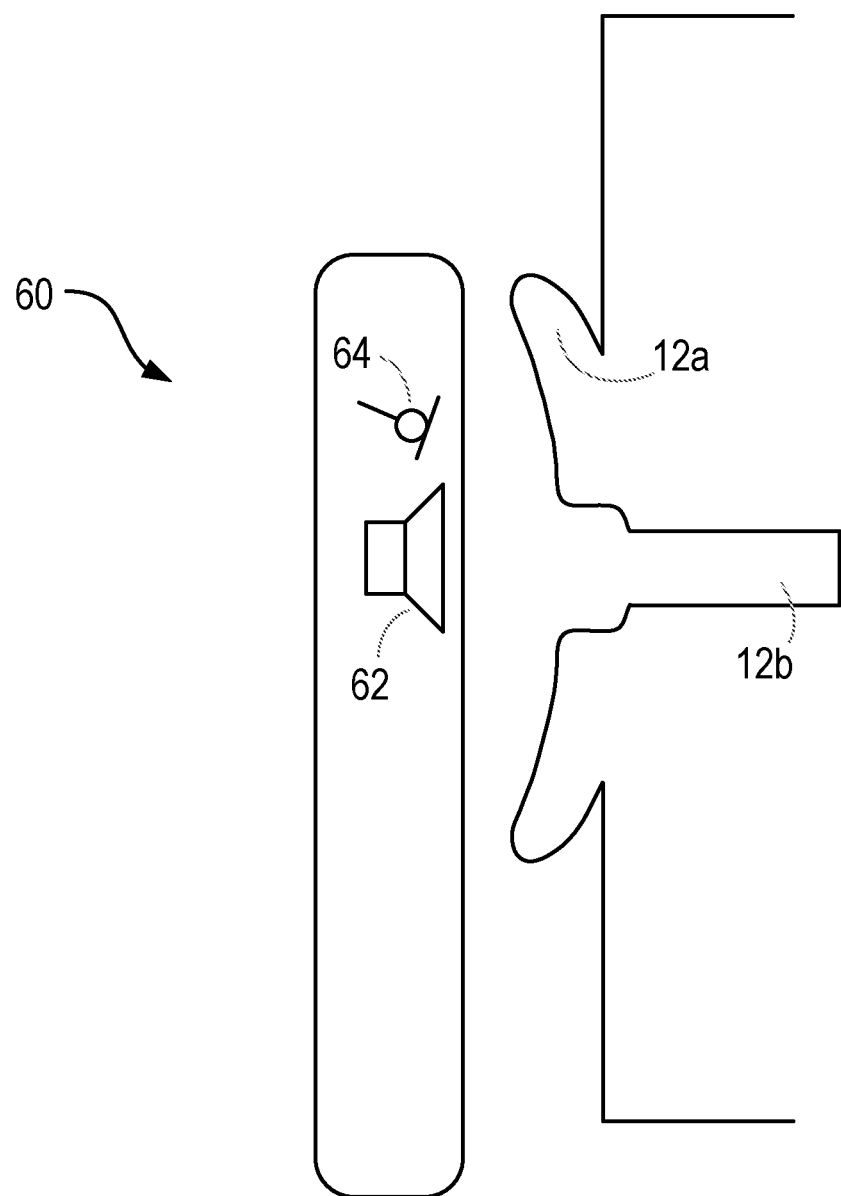

FIG. 1e shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that an acoustic stimulus applied to the ear via the one or more loudspeakers 62 generates a response from the ear which can be detected by the one or more microphones 64. As with the other devices, the loudspeaker(s) 62 and microphone(s) 64 may form part of an active noise cancellation system.

All of the personal audio devices described above thus provide audio playback to substantially a single user in use. Each device comprises one or more loudspeakers and one or more microphones, which may be utilized to generate biometric data related to the frequency response of the user's ear. The loudspeaker is operable to generate an acoustic stimulus, or acoustic probing wave, towards the user's ear, and the microphone is operable to detect and measure a response of the user's ear to the acoustic stimulus, e.g. to measure acoustic waves reflected from the ear canal or the pinna. The acoustic stimulus may be sonic (for example in the audio frequency range of say 20 Hz to 20 kHz) or ultra-sonic (for example greater than 20 kHz or in the range 20 kHz to 50 kHz) or near-ultrasonic (for example in the range 15 kHz to 25 kHz) in frequency. In some examples the microphone signal may be processed to measure received signals of the same frequency as that transmitted.

Another biometric marker may comprise otoacoustic noises emitted by the cochlear in response to the acoustic stimulus waveform. The otoacoustic response may comprise a mix of the frequencies in the input waveform. For example if the input acoustic stimulus consists of two tones at frequencies f1 and f2, the otoacoustic emission may include a component at frequency $2*f1-f2$. The relative power of frequency components of the emitted waveform has been shown to be a useful biometric indicator. In some examples therefore the acoustic stimulus may comprise tones of two or more frequencies and the amplitude of mixing products at sums or differences of integer-multiple frequencies generated by otoacoustic emissions from the cochlear may be measured. Alternatively, otoacoustic emissions may be stimulated and measured by using stimulus waveforms comprising fast transients, e.g. clicks.

Depending on the construction and usage of the personal audio device, the measured response may comprise user-specific components, i.e. biometric data, relating to the auricle 12a, the ear canal 12b, or a combination of both the auricle 12a and the ear canal 12b. For example, the circumaural headphones shown in FIG. 1a will generally acquire data relating to the auricle 12a and potentially also the ear canal 12b. The insert headphones shown in FIG. 1d will generally acquire data relating only to the ear canal 12b.

One or more of the personal audio devices described above (or rather, the microphones within those devices) may be operable to detect bone-conducted voice signals from the user. That is, as the user speaks, sound is projected away from the user's mouth through the air. However, acoustic vibrations will also be carried through part of the user's skeleton or skull, such as the jaw bone. These acoustic vibrations may be coupled to the ear canal 12b through the jaw or some other part of the user's skeleton or skull, and detected by the microphone. Lower frequency sounds tend to experience a stronger coupling than higher frequency sounds, and voiced speech (i.e. that speech or those phonemes generated while the vocal cords are vibrating) is coupled more strongly via bone conduction than unvoiced speech (i.e. that speech or those phonemes generated while the vocal cords are not vibrating). The in-ear headphone 50 may be particularly suited to detecting bone-conducted speech owing to the tight acoustic coupling around the ear canal 12b.

All of the devices shown in FIGS. 1a to 1e and described above may be used to implement aspects of the disclosure.

Figure 2:
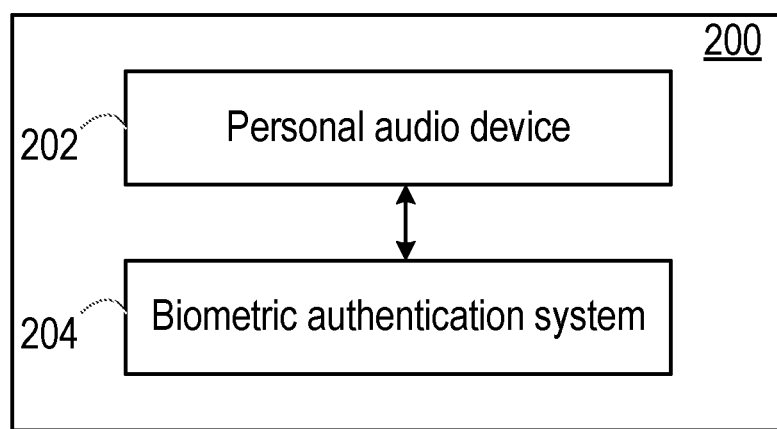
FIG. 2 shows an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configurable to provide audio playback to substantially a single user. The personal audio device 202 generally comprises one or more loudspeakers, and one or more microphones which, in use, are positioned adjacent to or within a user's ear. The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1a to 1e.

The biometric system 204 is coupled to the personal audio device 202 and operative to control the personal audio device 202 to acquire biometric data which is indicative of the individual using the personal audio device.

The personal audio device 202 thus generates an acoustic stimulus for application to the user's ear, and detects or measures the response of the ear to the acoustic stimulus. For example, the acoustic stimulus may be in the sonic range, or ultra-sonic. In some embodiments, the acoustic stimulus may have a flat frequency spectrum over a relevant frequency range, or be preprocessed in such a way that those frequencies that allow for a good discrimination between individuals are emphasized (i.e. have a higher amplitude than other frequencies). The measured response corresponds to the reflected signal received at the one or more microphones, with certain frequencies being reflected at higher amplitudes than other frequencies owing to the particular response of the user's ear.

The biometric system 204 may send suitable control signals to the personal audio device 202, so as to initiate the acquisition of biometric data, and receive data from the personal audio device 202 corresponding to the measured response. The biometric system 204 is operable to extract one or more features from the measured response and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as an "ear print". Authentication (alternatively referred to as verification or identification) comprises the acquisition of biometric data from an individual, and the comparison of that data to the stored ear prints of one or more enrolled or authorised users. A positive comparison (i.e. a determination that the acquired data matches or is sufficiently close to a stored ear print) results in the individual being authenticated. For example, the individual may be permitted to carry out a restricted action, or granted access to a restricted area or device. A negative comparison (i.e. a determination that the acquired data does not match or is not sufficiently close to a stored ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

Figure 3:
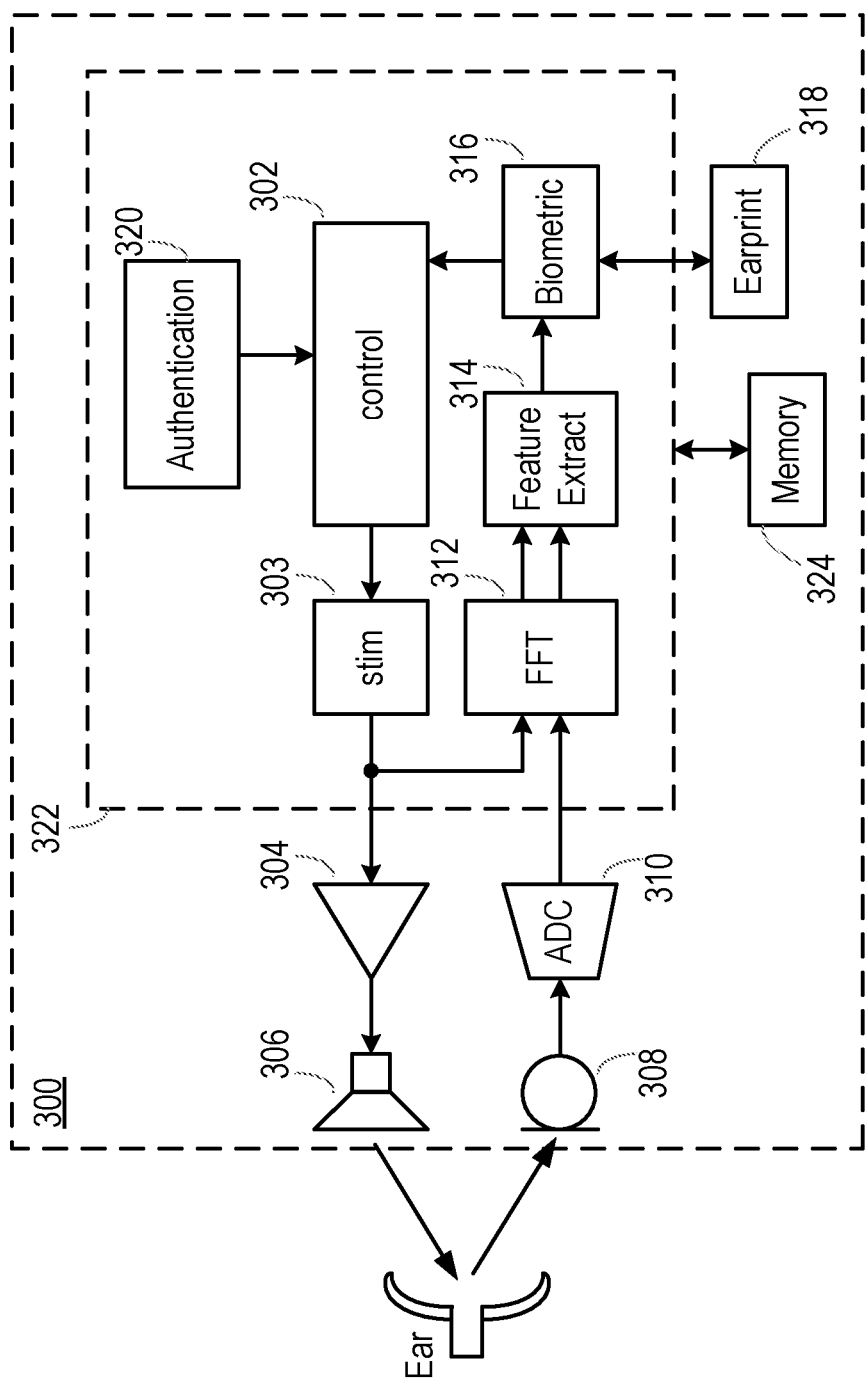
FIG. 3 shows a system according to embodiments of the disclosure.

FIG. 3 shows a system 300 according to embodiments of the disclosure.

The system 300 comprises processing circuitry 322, which may comprise one or more processors, such as a central processing unit or an applications processor (AP), or a digital signal processor (DSP). The system 300 further comprises memory 324, which is communicably coupled to the processing circuitry 322. The memory 324 may store instructions which, when carried out by the processing circuitry 322, cause the processing circuitry to carry out one or more methods as described below (see FIGS. 4 and 5 for example). The one or more processors may perform methods as described herein on the basis of data and program instructions stored in memory 324. Memory 324 may be provided as a single component or as multiple components or co-integrated with at least some of processing circuitry 322. Specifically, the methods described herein can be performed in processing circuitry 322 by executing instructions that are stored in non-transient form in the memory 324, with the program instructions being stored either during manufacture of the system 300 or personal audio device 202 or by upload while the system or device is in use.

The processing circuitry 322 comprises a stimulus generator module 303 which is coupled directly or indirectly to an amplifier 304, which in turn is coupled to a loudspeaker 306.

The stimulus generator module 303 generates an electrical audio signal (for example, under the instruction of control module 302) and provides the electrical audio signal to the amplifier 304, which amplifies it and provides the amplified signal to the loudspeaker 306. The loudspeaker 306 generates a corresponding acoustic signal which is output to the user's ear (or ears). The audio signal may be sonic or ultra-sonic, for example. The audio signal may have a flat frequency spectrum, or be preprocessed in such a way that those frequencies that allow for a good discrimination between individuals are emphasized (i.e. have a higher amplitude than other frequencies).

As noted above, the audio signal may be output to all or a part of the user's ear (i.e. the auricle or the ear canal). The audio signal is reflected off the ear, and the reflected signal (or echo signal) is detected and received by a microphone 308. The reflected signal thus comprises data which is characteristic of the individual's ear, and suitable for use as a biometric.

The reflected signal is passed from the microphone 308 to an analogue-to-digital converter (ADC) 310, where it is converted from the analogue domain to the digital domain. Of course, in alternative embodiments the microphone may be a digital microphone and produce a digital data signal (which does not therefore require conversion to the digital domain).

The signal is detected by the microphone 308 in the time domain. However, the features extracted for the purposes of the biometric process may be in the frequency domain (in that it is the frequency response of the user's ear which is characteristic). The system 300 therefore comprises a Fourier transform module 312, which converts the reflected signal to the frequency domain. For example, the Fourier transform module 312 may implement a fast Fourier transform (FFT). In some examples the biometric process may not be in the frequency domain, so the Fourier transform module may be omitted.

The transformed signal is then passed to a feature extract module 314, which extracts one or more features of the transformed signal for use in a biometric process (e.g. biometric enrolment, biometric authentication, etc). For example, the feature extract module 314 may extract the resonant frequency of the user's ear. For example, the feature extract module 314 may extract one or more mel frequency cepstrum coefficients. Alternatively, the feature extract module may determine the frequency response of the user's ear at one or more predetermined frequencies, or across one or more ranges of frequencies. The extracted features may correspond to data for a model of the ear.

The extracted feature(s) are passed to a biometric module 316, which performs a biometric process on them. For example, the biometric module 316 may perform a biometric enrolment, in which the extracted features (or parameters derived therefrom) are stored as part of biometric data 318 which is characteristic of the individual. The biometric data may be stored within the system 300 or remote from the system 300 (and accessible securely by the biometric module 316). Such stored data 318 may be known as an "ear print". In another example, the biometric module 316 may perform a biometric authentication, and compare the one or more extracted features to corresponding features in the stored ear print 318 (or multiple stored ear prints).

The biometric module 316 may generate a biometric result (which may be the successful or unsuccessful generation of an ear print, as well as successful or unsuccessful authentication) and output the result to control module 302.

In some embodiments the stimulus waveforms may be tones of predetermined frequency and amplitude. In other embodiments the stimulus generator may be configurable to apply music to the loudspeaker, e.g. normal playback operation, and the feature extract module may be configurable to extract the response or transfer function from whatever signal components the stimulus waveform contains.

Thus in some embodiments the feature extract module may be designed with foreknowledge of the nature of the stimulus, for example knowing the spectrum of the applied stimulus signal, so that the response or transfer function may be appropriately normalised. In other embodiments the feature extract module may comprise a second input to monitor the stimulus (e.g. playback music) and hence provide the feature extract module with information about the stimulus signal or its spectrum so that the feature extract module may calculate the transfer function from the stimulus waveform stimulus to received acoustic waveform from which it may derive the desired feature parameters. In the latter case, the stimulus signal may also pass to the feature extract module via the FFT module 312.

According to embodiments of the disclosure, the system 300 further comprises an additional authentication mechanism 320, which in the illustrated embodiment is coupled to the control module 302. In alternative embodiments, the additional authentication mechanism 320 may be coupled to the biometric module 316, for example.

The additional authentication mechanism 320 may be configured to provide one or more authentication algorithms in addition to the ear biometric algorithm described above. For example, the additional authentication mechanism 320 may comprise a voice biometric authentication module, configured to perform a biometric authentication algorithm on a voice signal, e.g. received via the microphone 308 or via another microphone such as a dedicated voice microphone (not illustrated). The voice signal may be air-conducted (i.e. travelling through the air to a microphone outside the user's ear) or bone-conducted (i.e. travelling through at least part of the user's skeleton or skull, such as the jaw bone, and detected by a suitable microphone or transducer). The bone-conducted voice signal may be detected by a microphone within the user's ear or external to the user's ear. In the former case, the microphone may be the same as that used for ear biometrics (and potentially the same as that used for active noise cancellation), or different.

For example, the additional authentication mechanism 320 may comprise an input-output mechanism for accepting and authorising the user based on a passphrase, password, or pin number entered by the user and associated with the authorised user. The input-output mechanism may pose a question to the user based on the passphrase, password or pin number, the answer to which does not reveal the entire passphrase, password or pin number. For example, the question may relate to a particular character or digit of the passphrase, password or pin number (e.g., "what is the third character of the password?"). Thus only part of the user's passphrase, password or pin number is input by the user in response to the question. The question may require the performance of a mathematical or logical operation on the pin number or part thereof (e.g., "what is the first digit of the pin number plus three?"). The input-output mechanism may output the question audibly (e.g. through playback over the loudspeaker 306), so that only the user can hear the question. Further, the input-output mechanism may provide for input of the answer audibly (e.g. through the microphone 308 or some other microphone such as a voice mic), or via some other input mechanism, such as a touchscreen, keypad, keyboard, or similar.

As the question is provided only to the user (e.g. via the personal audio device), third parties in the vicinity of the user may be unable to hear it. Thus, although the third parties may overhear the spoken answer, they are unable to determine the question which was asked and therefore acquire no useful knowledge as to the user's password, passphrase or pin number.

Figure 4:
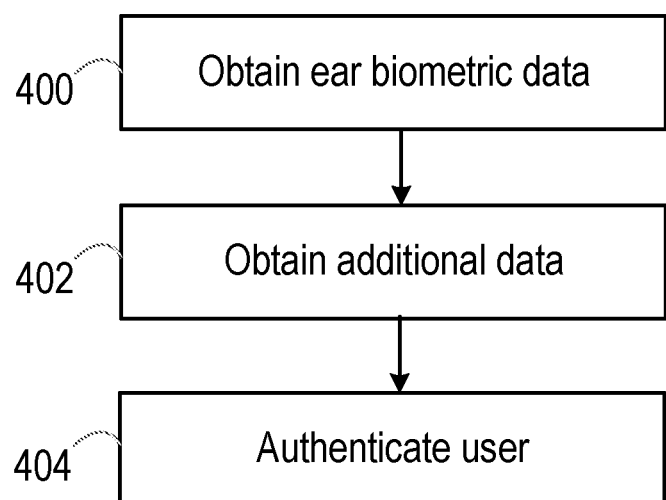
FIG. 4 is a flowchart of a method according to embodiments of the disclosure.

FIG. 4 is a flowchart of a method according to embodiments of the disclosure.

In step 400, ear biometric data is acquired from a user seeking authentication. For example, the biometric system may acquire ear model data from a personal audio device, which generates an acoustic stimulus for application to the user's ear, and extract one or more features from the measured response to that acoustic stimulus (e.g. as detected with a microphone in the personal audio device).

In step 402, additional authentication data is obtained from the user. For example, the additional authentication data may comprise voice biometric data. e.g. received via the microphone 308 or via another microphone such as a dedicated voice microphone (not illustrated).

For example, the additional authentication data may comprise a response to a security question output to the user. The question may relate to a passphrase, password or pin number. In some embodiments, the question may be configured such that the correct answer does not reveal the entire passphrase, password or pin number. For example, the question may relate to a particular character or digit of the passphrase, password or pin number (e.g., "what is the third character of the password?"). Thus only part of the user's passphrase, password or pin number is input by the user in response to the question. The question may require the performance of a mathematical or logical operation on the pin number or part thereof (e.g., "what is the first digit of the pin number plus three?"). The question may be output audibly (e.g. through playback over the loudspeaker 306), so that only the user can hear the question. Further, the input-output mechanism may provide for input of the answer audibly (e.g. through the microphone 308 or some other microphone such as a voice mic), or via some other input mechanism, such as a touchscreen, keypad, keyboard, or similar. In some embodiments, the audible answer may be used for voice biometric authentication as well as a response to the security question.

In step 404, the user is authenticated based on the ear biometric data and the additional data obtained in step 402.

The authentication may be carried out on the combination of data in multiple different ways. For example, in one embodiment separate authentication algorithms may be carried out on each of the sets of data acquired in steps 400 and 402, and separate authentication scores acquired from each of the sets of data. The scores may then be combined to generate an overall score, indicating the overall likelihood that the user is an authorised user, with the authentication decision being taken on this score (e.g. by comparing the score to a threshold). In an alternative embodiment, the individual biometric scores may be handled separately (e.g., compared to separate thresholds) and individual authentication decisions being taken on each score. Overall authentication is then based on a combination of the decisions. For example, failure at any one of the authentication algorithms may result in failure of the authentication overall. Thus, if the ear biometric algorithm results in an authentication, but one or more of the other mechanisms results in a rejection (i.e. because the voice does not match a stored voice print for the user, or the response to the security question was wrong), the user may be rejected overall.

Figure 5:
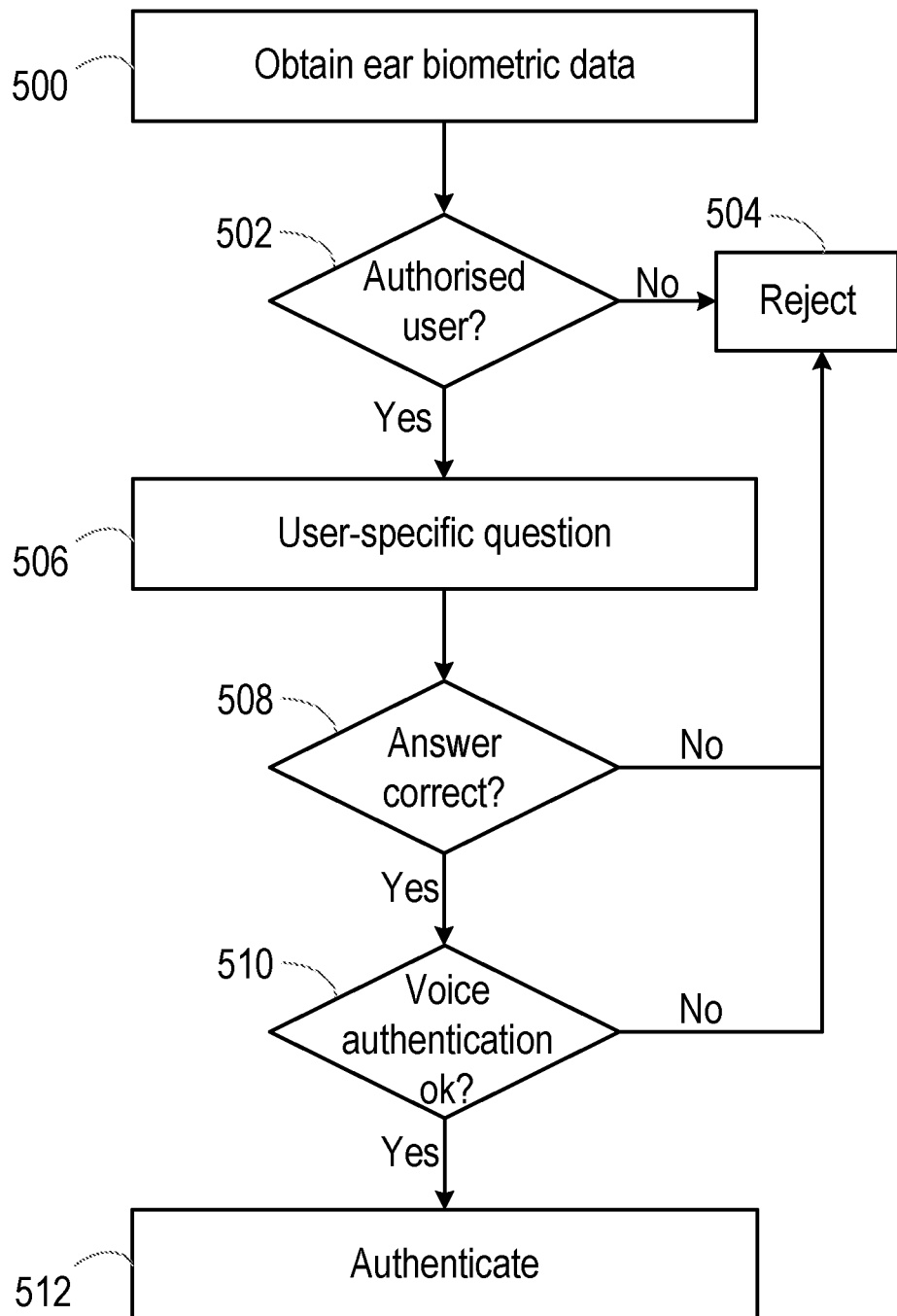
FIG. 5 is a flowchart of a method according to further embodiments of the disclosure.

FIG. 5 is a flowchart of a method according to further embodiments of the disclosure. The method may be carried out in the context of a user seeking authentication with a system (such as the system 300 described above), and utilizing a personal audio device to communicate with the system (i.e. providing speech input to the system and/or receiving audio output from the system).

In step 500, ear biometric data is obtained from the user via the personal audio device. One or more loudspeakers or similar transducers positioned close to or within the ear generate an acoustic stimulus, and one or more microphones similarly positioned close to or within the ear detect the acoustic response of the ear to the acoustic stimulus. One or more features may be extracted from the response signal, and used to characterize the individual. The acoustic stimulus may comprise a flat-spectrum signal, a signal in which frequencies found to be discriminative of individuals have greater amplitude than other frequencies, or may even be a normal playback signal (e.g. music).

In step 502, a biometric algorithm is performed on the acquired data to determine whether the user is an authorised user. For example, the one or more extracted features may be compared to one or more stored ear models (i.e. ear prints), and a biometric score generated, indicating the level of similarity or closeness between the acquired data and the stored ear models. If the acquired data does not match any of the stored ear models to a sufficient degree (e.g. the biometric scores are less than a threshold value for each of the stored ear models), the method proceeds to step 504 in which the user is rejected by the authentication system. For example, the user may be prevented from performing a restricted operation or accessing a restricted application or area. Alternatively, the method may be restarted and authentication re-attempted.

If the acquired data matches one of the stored ear models to a sufficient degree (e.g. the biometric score is greater than or equal to a threshold value), the user may be identified as the authorised user associated with that stored ear model and the method proceeds to step 506.

In step 506, a security question is output to the user. The security question may be specific to the user identified in step 502, or the answer to the security question may be specific to the user identified in step 502. The security question may be played back to the user through the speaker used to obtain the ear biometric data.

The question may relate to a passphrase, password or pin number associated with the authorised user. In some embodiments, the question may be configured such that the correct answer does not reveal the entire passphrase, password or pin number. For example, the question may relate to a particular character or digit of the passphrase, password or pin number (e.g., "what is the third character of the password?"). Thus only part of the user's passphrase, password or pin number is input by the user in response to the question. The question may require the performance of a mathematical or logical operation on the pin number or part thereof (e.g., "what is the first digit of the pin number plus three?").

The user thus speaks the answer to the security question and a corresponding voice signal is received by the system. The speech may be detected by the microphone used to acquire the ear biometric data and/or another microphone (such as a dedicated voice microphone).

The system may comprise a speech recognition module, or an interface with an external speech recognition module over which the voice signal can be sent for analysis. In either case, the voice signal from the user is analysed in step 508 to determine if the answer uttered by the user is correct. If the answer is incorrect, the method may proceed to step 504, and rejection of the user.

If the answer is correct, the method proceeds to step 510, in which a voice biometric algorithm is performed on the voice signal (i.e. the response to the question posed in step 506). (In alternative embodiments, steps 508 and 510 may be carried out simultaneously with each other.) The voice biometric algorithm may comprise a comparison of one or more features extracted from the voice signal to a stored voice model (i.e. a voice print) of the authorised user identified in step 502. A voice biometric score may be generated, indicating the level of similarity between the voice signal and the stored voice model.

In one embodiment, the voice biometric score is compared to a respective threshold value and a decision taken on whether the voice signal is a match to the stored voice model. If the decision is positive (i.e. if the voice biometric score equals or exceeds the threshold value), the method proceeds to step 512 and the user can be authenticated as the authorised user. If the decision is negative (i.e. the voice biometric score is less than the threshold), the method proceeds to step 504 and the user is rejected.

In an alternative embodiment, the voice biometric score is combined with the ear biometric score (i.e. obtained in step 502) to generate an overall score, and the overall score compared to an overall threshold value. The biometric scores may be combined by simply summing.

Alternatively, the biometric scores may subject to a weighted summation, with each biometric score weighted by a respective coefficient. For example, one method of achieving such weighting is as follows:

$$S_{total} = p_1 s_1 + p_2 s_2$$

where $S_{total}$ is the total (i.e. combined, overall) biometric score, $s_1$ and $s_2$ are the biometric scores obtained via the separate authentication algorithms (e.g. ear and voice, respectively), $p_1$ and $p_2$ are weighting coefficients, and $p_1 + p_2 = 1$. The biometric scores $s_1$ and $s_2$ may also take values between 0 and 1.

The weighting coefficients may be fixed, or dynamically adjustable. For example, in one embodiment the weighting coefficients may be determined based on one or more quality metrics related to the biometric data (e.g. the ear and voice biometric data). The one or more quality metrics may comprise one or more of: a signal to noise ratio; the presence of clipping in the signal; one or more spectral parameters (such as spectral peaking, spectral flatness, spectral tilt, etc); energy per frequency bin, etc. Thus if the quality of one of the sets of biometric data is low (or relatively low compared to the other biometric data), the weighting coefficients may be adjusted to emphasize the biometric score for the higher-quality biometric algorithm.

Methods described herein may be utilized to achieve power savings in the authentication system. For example, one or more parts of the system 300 may be kept in a low-power state until the user has passed at least a first authentication algorithm (e.g. the ear biometric algorithm). Upon passing the first authentication algorithm, further parts of the system may be powered on to carry out one or more second authentication algorithms (e.g. voice biometric, or security question algorithms). For example, the authentication module 320 may be kept in a low-power state until the biometric module 316 generates a positive authentication result based on the ear biometric algorithm (e.g. in step 502).

Embodiments of the disclosure thus provide methods, apparatus and systems for authenticating a user.

Embodiments described above have focussed on an implementation in which ear biometrics and/or voice biometrics are performed on signals detected in a single ear. It will be appreciated by those skilled in the art that the embodiments may straightforwardly be adapted to take into consideration biometric data obtained from both ears of a user. Thus, where the description above discloses acquiring data from an ear (e.g. through application of an acoustic stimulus and detection of the response, or acquisition of a bone-conducted voice signal in the ear), data may similarly be acquired from two ears. For example, the system 300 described above may comprise respective signal processing chains for data from each ear (e.g. respective ADCs, Fourier transform modules, and/or feature extract modules), or a single signal processing chain which is multiplexed between data streams generated within each ear. Biometric algorithms may similarly be performed on data from both ears, and this may be combined as described above, i.e. separate biometric authentication scores combined to form a combined score on which an overall decision is determined, or separate biometric authentication decisions which are then combined to determine an overall decision.

Embodiments may be implemented in an electronic, portable and/or battery powered host device such as a smartphone, an audio player, a mobile or cellular phone, or a handset. Embodiments may be implemented on one or more integrated circuits provided within such a host device. Embodiments may be implemented in a personal audio device configurable to provide audio playback to a single person, such as a smartphone, a mobile or cellular phone, headphones, earphones, etc., see FIGS. 1a to 1e. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments likewise, with the benefit of this disclosure, will be apparent to those having ordinary skill in the art, and such embodiments should be deemed as being encompassed herein.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

The invention claimed is:

1. A method in a biometric authentication system, the method comprising:
    obtaining, with a personal audio device, ear biometric data for a user to be authenticated;
    identifying the user as a particular authorised user based on the ear biometric data;
    outputting a security question message audibly to the user via the personal audio device, the security question message being specific to the particular authorised user, wherein the security question message relates to a pin number associated with the particular authorised user and the security question message is configured such that a correct response relates only to part of the pin number, and the security question message comprises a mathematical operation to be carried out by the user on the part of the pin number; and
    authenticating the user as the particular authorised user based on a spoken response message from the user.

2. The method according to claim 1, wherein authenticating the user as the particular authorised user based on the spoken response message comprises authenticating the user as the particular authorised user in response to a determination that an answer to the security question message in the spoken response message is correct.

3. The method according to claim 1, wherein the method further comprises obtaining voice biometric data from the spoken response message, and wherein authenticating the user as the particular authorised user based on the spoken response message comprises authenticating the user as the particular authorised user based on the voice biometric data.

4. The method according to claim 1, wherein the step of obtaining ear biometric data comprises:

initiating an acoustic stimulus for application to the user's ear; and extracting one or more features from a measured response to the acoustic stimulus.

5. The method according to claim 4, wherein the acoustic stimulus comprises an audio playback signal.

6. The method according to claim 5, wherein the audio playback signal comprises music.

7. The method according to claim 4, wherein the step of extracting one or more features from the measured response comprises extracting one or more features from a transfer function between the acoustic stimulus and the measured response.

8. The method according to claim 1, wherein the ear biometric data is obtained by a microphone in the personal audio device.

9. The method according to claim 8, wherein the microphone is further utilized as part of an active noise cancellation system.

10. An electronic apparatus, comprising processing circuitry and a non-transitory machine-readable medium storing instructions which, when executed by the processing circuitry, cause the electronic apparatus to:

obtain, with a personal audio device, ear biometric data for a user to be authenticated;

identify the user as a particular authorised user based on the ear biometric data;

output a security question message audibly to the user via the personal audio device, the security question message being specific to the particular authorised user, wherein the security question message relates to a pin number associated with the particular authorised user and the security question message is configured such that a correct response relates only to part of the pin number, and the security question message comprises a mathematical operation to be carried out by the user on the part of the pin number; and authenticate the user as the particular authorised user based on a spoken response message from the user.

11. The electronic apparatus according to claim 10, wherein the electronic apparatus is caused to authenticate the user as the particular authorised user based on the spoken response message by authenticating the user as the particular authorised user in response to a determination that an answer to the security question message in the spoken response message is correct.

12. The electronic apparatus according to claim 10, wherein the electronic apparatus is further caused to obtain voice biometric data from the spoken response message, and wherein the electronic apparatus is caused to authenticate the user as the particular authorised user based on the spoken response message by authenticating the user as the particular authorised user based on the voice biometric data.

13. The electronic apparatus according to claim 10, wherein the electronic apparatus is caused to obtain ear biometric data by:

initiating an acoustic stimulus for application to the user's ear; and extracting one or more features from a measured response to the acoustic stimulus.

14. A non-transitory machine-readable medium storing instructions which, when executed by processing circuitry of an electronic apparatus, cause the electronic apparatus to:

obtain, with a personal audio device, ear biometric data for a user to be authenticated;

identify the user as a particular authorised user based on the ear biometric data;

output a security question message audibly to the user via the personal audio device, the security question message being specific to the particular authorised user, wherein the security question message relates to a pin number associated with the particular authorised user, and the security question message is configured such that a correct response relates only to part of the pin number, and the security question message comprises a mathematical operation to be carried out by the user on the part of the pin number; and authenticate the user as the particular authorised user based on a spoken response message from the user.

15. The method according to claim 3, wherein identifying the user as a particular authorised user based on the ear biometric data comprises generating a first biometric score indicative of a level of similarity between the ear biometric data and a stored profile for the particular authorised user, and wherein authenticating the user as the particular authorised user based on the voice biometric data comprises generating a second biometric score indicative of a level of similarity between the voice biometric data and the stored profile for the particular authorised user, combining at least the first and second biometric scores to generate an overall biometric score, and comparing the overall biometric score to a threshold.

* * * * *

UNITED STATES PATENT AND TRADEMARK OFFICE
CERTIFICATE OF CORRECTION

PATENT NO. : 10,984,083 B2
APPLICATION NO. : 16/028863
DATED : April 20, 2021
INVENTOR(S) : Lesso et al.

It is certified that error appears in the above-identified patent and that said Letters Patent is hereby corrected as shown below:

On the Title Page

In Column 1, below Item "(60)", insert -- (30) Foreign Application Priority Data
Jan. 30, 2018 (GB) ............... 1801530.5 --, therefor.

Signed and Sealed this
Eighth Day of November, 2022

Katherine Kelly Vidal
*Director of the United States Patent and Trademark Office*